United States Patent
Sitterlet et al.

(10) Patent No.: US 8,720,973 B2
(45) Date of Patent: May 13, 2014

(54) ENCAPSULATED VEHICLE WINDOW ASSEMBLY WITH INTERLOCKING SEAL AND METHOD OF BONDING SAME IN VEHICLE BODY OPENING

(75) Inventors: Charles Sitterlet, Northwood, OH (US); Charles E. Ash, Perrysburg, OH (US); Kazuhiro Fujiwara, Tokyo (JP); Tsuneaki Sakai, Tokyo (JP)

(73) Assignee: Pilkington Group Limited, St. Helens (GB)

( * ) Notice: Subject to any disclaimer, the term of this patent is extended or adjusted under 35 U.S.C. 154(b) by 0 days.

(21) Appl. No.: 13/369,508

(22) Filed: Feb. 9, 2012

(65) Prior Publication Data
US 2012/0205940 A1 Aug. 16, 2012

Related U.S. Application Data

(60) Provisional application No. 61/499,305, filed on Jun. 21, 2011, provisional application No. 61/441,756, filed on Feb. 11, 2011.

(51) Int. Cl.
*B60J 10/02* (2006.01)

(52) U.S. Cl.
USPC .................. 296/146.15; 52/208; 52/204.591; 52/204.597; 49/498.1

(58) Field of Classification Search
USPC ............. 296/84.1, 93, 96.21, 216.06, 216.09, 296/146.15; 52/208, 204.591, 204.597; 49/482.1, 498.1
See application file for complete search history.

(56) References Cited

U.S. PATENT DOCUMENTS

| | | | |
|---|---|---|---|
| 5,882,066 A | | 3/1999 | Schonebeck |
| 6,152,523 A | * | 11/2000 | Schonebeck ............. 296/216.09 |
| 6,517,150 B2 | | 2/2003 | De Gaillard et al. |
| 7,837,251 B2 | * | 11/2010 | Rich et al. ................ 296/146.15 |
| 2012/0015202 A1 | * | 1/2012 | Kenens et al. ................ 428/516 |

FOREIGN PATENT DOCUMENTS

| | | | |
|---|---|---|---|
| DE | 3708047 A1 | * | 10/1988 |
| DE | 9418090 U1 | | 1/1995 |

* cited by examiner

*Primary Examiner* — Dennis H Pedder
*Assistant Examiner* — Beverly Becker
(74) *Attorney, Agent, or Firm* — Marshall & Melhorn, LLC

(57) ABSTRACT

An encapsulated vehicle window assembly has, as a component thereof, a polymeric seal member surrounding at least a peripheral portion of a transparent glass substrate, the polymeric seal having interlocking portions. A method of installing the encapsulated vehicle window assembly in a vehicle body opening is also an aspect of the invention.

12 Claims, 4 Drawing Sheets

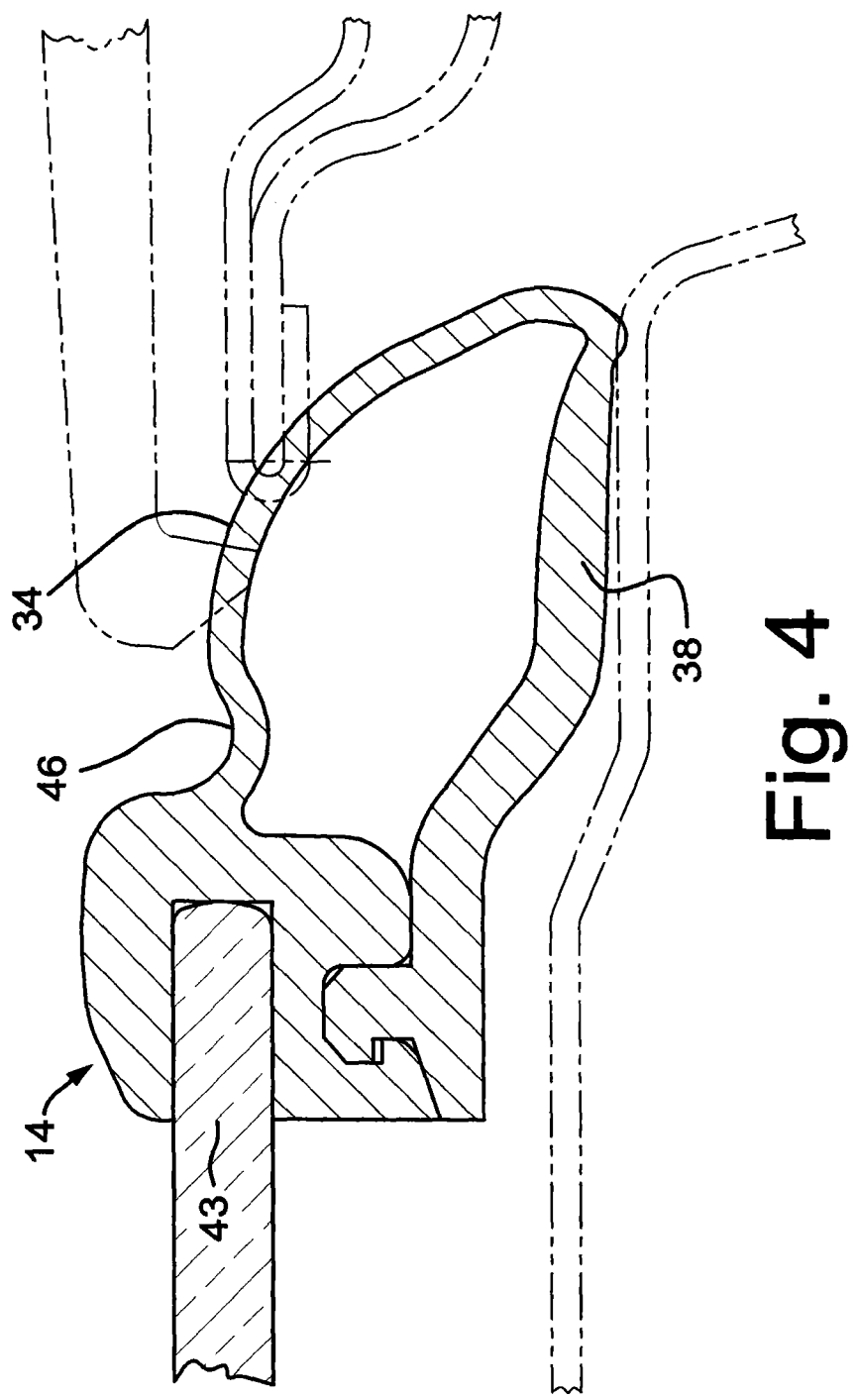

ENCAPSULATED VEHICLE WINDOW ASSEMBLY WITH INTERLOCKING SEAL AND METHOD OF BONDING SAME IN VEHICLE BODY OPENING

RELATED APPLICATIONS

This application is claiming the benefit under 35 U.S.C. 119(e), of the provisional applications filed Feb. 11, 2011 and Jun. 21, 2011 under 35 U.S.C. 111(b), which were granted Ser. Nos. 61/441,756 and 61/499,305, respectively. These provisional applications are both hereby incorporated herein by reference in their entireties.

BACKGROUND OF THE INVENTION

The present invention relates, generally, to encapsulated vehicle window assemblies, in which a seal member surrounds at least a portion of the peripheral region of a transparent glass substrate. In particular, the invention relates to such a seal member having interlocking portions, to form a molded-on seal.

Encapsulated window assemblies having various seals are described in the patent literature, for example:

DE 9418090 describes a first section of a profile of edging for a sliding or lifting roof of a motor vehicle consists of plastics or an elastomer with a hardness of 40 to 90 Shore A. The roof edging is injection molded around the edge of the roof and glued to it. The first profile section has a projection which buttons into an aperture of a second profile section. The outside of the second profile section is formed by soft foamed plastics or elastomer. The profile has a slide coating on its outer surface. The projection has the same Shore A hardness as the first profile section, or is manufactured from a material of comparable hardness.

U.S. Pat. No. 5,882,066 describes an edge gap sealing arrangement for the rigid lid of an automobile sliding roof, which sealing arrangement is molded onto the peripheral edge of the lid to form a frame body. The frame body has what is termed an initially free edge strip extending outwards, which is bent over to form a hollow chamber. The edge strip is arranged to be adjustably secured, preferably from below, to the frame body, with its outer edge adjacent to the peripheral edge of the lid. The seal so formed is said to be adjustable as to its cross-section and the width of the hollow chamber, so that it is adapted to dimensional variations and irregularities in the edge gap. Preferably at the outer edge of the edge strip, an inner surface portion is provided, which after the edge strip has been bent to form the hollow chamber, it is adjustably secured to a counter-surface of the frame body by means of a clamping profile strip. The clamping profile strip engages into a clamping groove of the frame body.

U.S. Pat. No. 6,517,150 describes a cover unit for closing the roof opening in the solid skin of a motor vehicle roof having a cover element composed of an at least partially transparent plastic and a reinforcing frame, for example, made of a metal, which extends along the side edge of the cover element and which bears a seal which surrounds the side edge of the cover element for contact against an essentially vertically running roof-mounted sealing surface. The reinforcing frame is cemented, using a flexible cement, to the cover element such that the cover element can move, in the transverse direction relative to the reinforcing frame, in order to enable thermal expansion of the cover element. The seal has a roof sealing area contacting a roof-mounted sealing surface, which is said to be substantially unaffected by thermal expansion of the cover element, and the seal has a cover sealing area for compensation of thermal expansion of the cover element.

SUMMARY OF THE INVENTION

The invention relates to encapsulated vehicle window assemblies having, as a component thereof, a seal member surrounding at least a portion of the peripheral region of a transparent glass substrate. More specifically, the invention relates to such a polymeric seal having interlocking portions and a method of installing same in a vehicle body opening.

An encapsulated window assembly according to the invention includes a transparent glass substrate, preferably a transparent glass vehicle window, having an interlockable seal molded onto at least a portion of the periphery thereof.

In a preferred configuration, a base portion of the seal of the invention is molded onto first (exterior) and second (interior) major surfaces, as well as the peripheral edge, of the glass substrate. In the base portion proximate the second major surface of the glass substrate, a female locking portion is formed. Extending from the base portion, preferably from the base portion proximate the first major surface of the glass substrate, is a lip portion. The lip portion is formed to be preferentially bent at an elbow portion and has, at a distal portion thereof, a male locking portion formed therein. When the lip portion is bent at the elbow portion, the male locking portion is positioned so as to be interlockable with the female locking portion present in the base portion. When the male and female locking portions are interlocked, an enclosed sealing profile is formed.

It has been found to be advantageous that the interlocked male/female locking portions are, firstly, supported by the major surfaces of the glass substrate, and, secondly, when the encapsulated window assembly is inserted into a vehicle body opening defined by a bonding flange, the bonding flange acts as a second means of support for the seal. With such multiple means of support, no reinforcing member is needed as a component of the seal itself. Not requiring such an integral reinforcing member as part of the seal is particularly advantageous, as it reduces cost and renders the process of molding the seal considerably more simple.

These and further objects, features and advantages of the present invention will become apparent from the following description when taken in connection with the accompanying drawings, which for purposes of illustration only, show several embodiments in accordance with the present invention.

BRIEF DESCRIPTION OF THE DRAWINGS

FIG. 4 shows a cross-sectional view of the seal according to the invention showing an alternative configuration of the deformable lip portion of the seal.

DETAILED DESCRIPTION OF THE INVENTION

The invention relates to encapsulated window assemblies having, as a component thereof, a seal member surrounding at least a portion of the peripheral region of a transparent glass substrate. More specifically, the invention relates to a molded-on polymeric seal having interlocking portions and a method of installing same in a vehicle body opening. The subject encapsulated window assembly is suitable for a variety of vehicle windows, but is especially suitable for a fixed vehicle window, such as a quarter window. The subject window assembly can be made in virtually any shape or size desired.

An encapsulated window assembly 10 according to the present invention comprises a suitably sized sheet or panel of glass 12, preferably a body tinted or coated soda-lime-silica glass having good solar control properties.

A seal 14 is molded around at least a portion of the glass sheet or panel 12 by any suitable method. Preferably, the seal 14 is injection molded, but extrusion or reaction injection molding (RIM) are other possible methods of molding which may be useful in connection with the present invention.

The seal 14 of the present invention is molded from any suitable polymeric material; however, one or more of a variety of thermoplastic elastomer materials (TPE) which adheres reasonably readily to glass, is reasonably cost effective, and is flexible enough to function as a one-piece, or integral seal, is preferred. Suitable TPE materials include, for example, Sevrene®, Santoprene®, Invision™, Forprene™, Duragrip™, Dynaflex™, Kraton™, Kralburg, Interion, Nexprene™, Veralloy™ and GLS™ Representative properties of preferred materials may include, but are not limited to: low compressive set, elasticity >200% and brittleness temperature <−32° F.

The durometer, or hardness, of the polymeric materials comprising the interlocking seal 14 of the present invention has been found to desirably be no more than 50 Shore A, which provides for good structural stability in thicker profile portions and good flexibility in portions of the seal having thinner profiles. For some applications, however a material having a durometer between 50 Shore A and 80 Shore A may be useful in connection with the invention. Desirably, the material of the seal 14 of the invention is also reasonably durable as described in the product specifications of various vehicle manufacturers, particularly as to being scratch/mar resistant and resistant to degradation by exposure to UV radiation.

Figure 1:
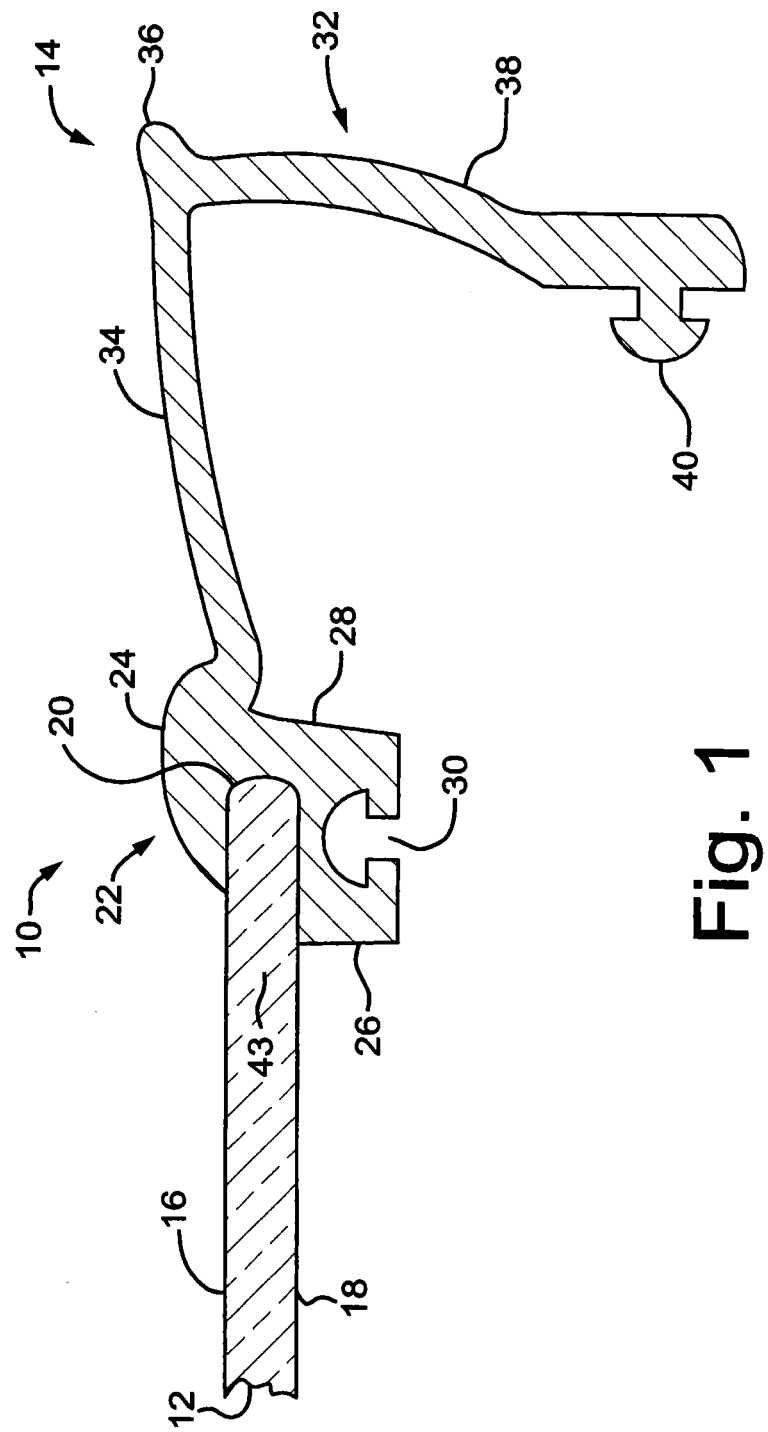
FIG. 1 shows a cross-sectional view of the seal of the invention with the seal being bonded to the glass substrate, but in a non-interlocked configuration.

FIG. 1 shows a cross-sectional view of the encapsulated window assembly 10 according to the invention, in a non-interlocked position. The glass substrate 12 comprises first (exterior) 16 and second (interior) 18 major surfaces terminating in a peripheral edge 20. A base portion 22 having an exterior profile portion 24, an interior profile portion 26 and a connecting portion 28 are moldingly bonded to the first major surface 16, the second major surface 18 and the peripheral edge 20 of the glass sheet 12, respectively. A female locking portion 30 is formed in the interior profile portion 26 of the base portion 22. The shape of the female locking portion 30 can be any shape which permits positive interlocking with a male locking portion, as will be described in greater detail hereafter.

A lip portion 32 extends for a predetermined length from the base portion 22. Preferably, the lip portion 32 which extends substantially laterally from the exterior profile portion 24 of the base portion 22 comprises: a deformable profile portion 34, a flexible elbow portion 36 and a distal locking portion 38, which includes a male locking portion 40 having a shape complementary to that of the female locking portion 30. Preferably, lip portion 32 is preferentially bendable at the elbow portion 36.

The deformable profile portion 34 of the lip portion 32 is preferably 1-3 mm thick to allow for substantial flexibility.

The distal locking portion 38 is likewise preferably 1-3 mm thick, but tends toward the upper end of the range.

The sealing force exerted by the portion or portions of the inventive seal against the sheet metal of a vehicle body opening is preferably between 1N and 15 N/100 mm, more preferably between 6N and 10N/100 mm.

Figure 2:
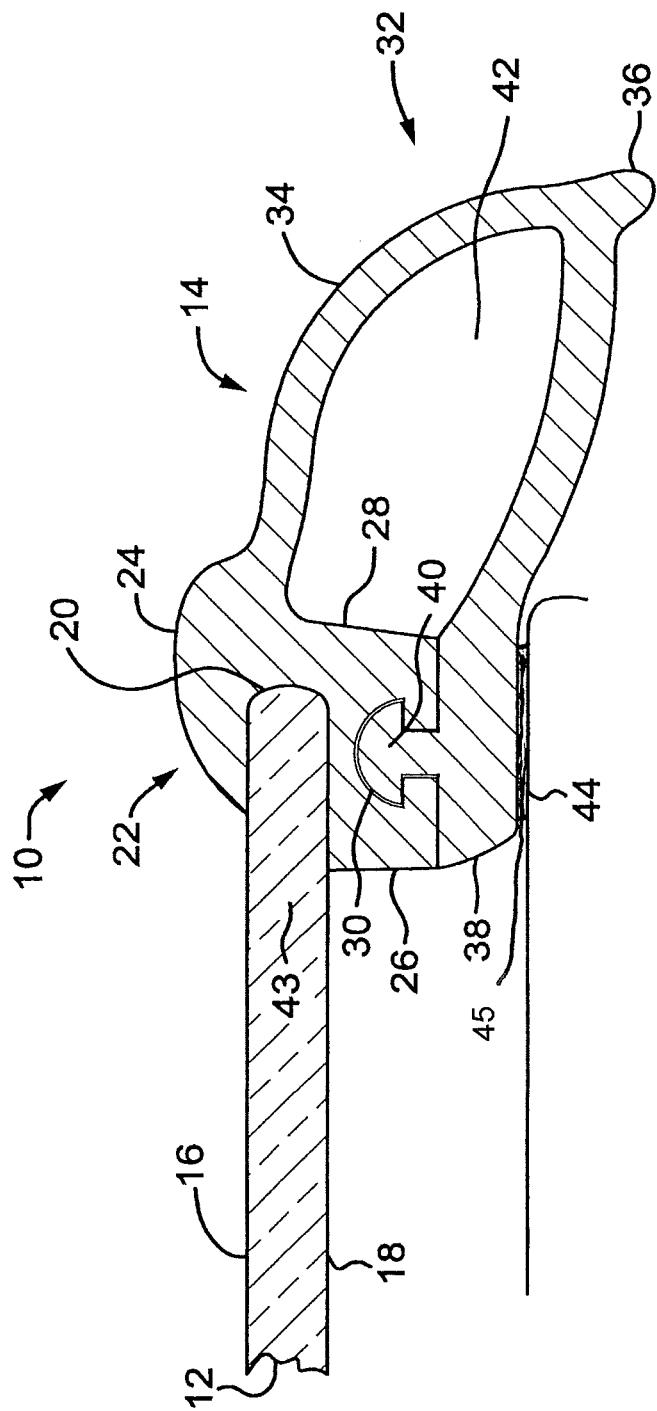
FIG. 2 shows a cross-sectional view of the seal of the invention with the seal being bonded to the glass substrate and in an interlocked configuration.

FIG. 2 shows a cross-sectional view of the seal 14 of the invention, but in a configuration wherein the female locking portion 30 and the male locking portion 40 are interlocked. The description of the major elements of the glass substrate 12 and the seal 14 are otherwise as described in connection with FIG. 1.

In such interlocked configuration, the lip portion 32 is preferably bent at the elbow portion 36 of the lip portion 32 so that the distal locking portion 38 is proximate the interior profile portion 26 of the base portion 22, and the male locking portion 40 is positioned so as to be capable of interlocking with the female locking portion 30 formed in the interior profile portion 26 of the base portion 22. When in such interlocked configuration, as can be seen in FIG. 2, the deformable profile portion 34, the elbow portion 36 and the distal locking portion 38 of the lip portion 32 form an enclosed seal profile having an irregularly elliptically shaped profile defining an enclosed space portion 42. As will be appreciated, the flexibility of the lip portion 32 and the deformability of the enclosed space portion 42 allow the seal 14 to conform closely to the shape of whatever object it is adjacent to, for example, the "B" pillar or "C" pillar of a vehicle door.

Still referring to FIG. 2, it has also been found to be advantageous that when the seal 14 is in its interlocked configuration, the glass substrate 12 acts as a first supporting member 43 to increase the strength of the glass/seal assembly 10. Additionally, it has been found that when the encapsulated window assembly 10 is installed in a vehicle body opening, and is preferably bonded to the metal bonding flange which defines the periphery of the vehicle body opening, such metal bonding flange acts as a second supporting member 44, further enhancing the strength/stability of the glass/seal assembly 10. Preferably, this bond is an adhesive bond 45. Thus, unlike many known encapsulated window/seal assemblies, no additional reinforcing member need be incorporated into the seal, resulting in the disadvantages previously noted herein.

It has further been found to be advantageous that the encapsulated window assembly 10 of the invention, when employed as a vehicle quarter window, not only provides a weather tight seal, but does so while reducing the effort necessary to close the adjacent vehicle door against the seal. One way to achieve this advantage is by the seal configuration illustrated in FIG. 4. The illustrated configuration achieves the desired objective by the relative stiffness of the thicker distal locking portion 38 relative to the flexibility of the relatively thinner deformable profile portion 34, in particular the preferentially flexible "escape" portion 46 of the deformable profile portion 34. The escape portion 46 of the seal 14, among other advantages, may help reduce stress on the encapsulated window assembly 10 when the encapsulated window assembly 10 is in a closed position and the seal is compressed against the sheet metal of a vehicle body opening. The flexibility of the escape portion 46 may also help prevent the seal 14 from being damaged by rough edges of the vehicle sheet metal.

Figure 3:
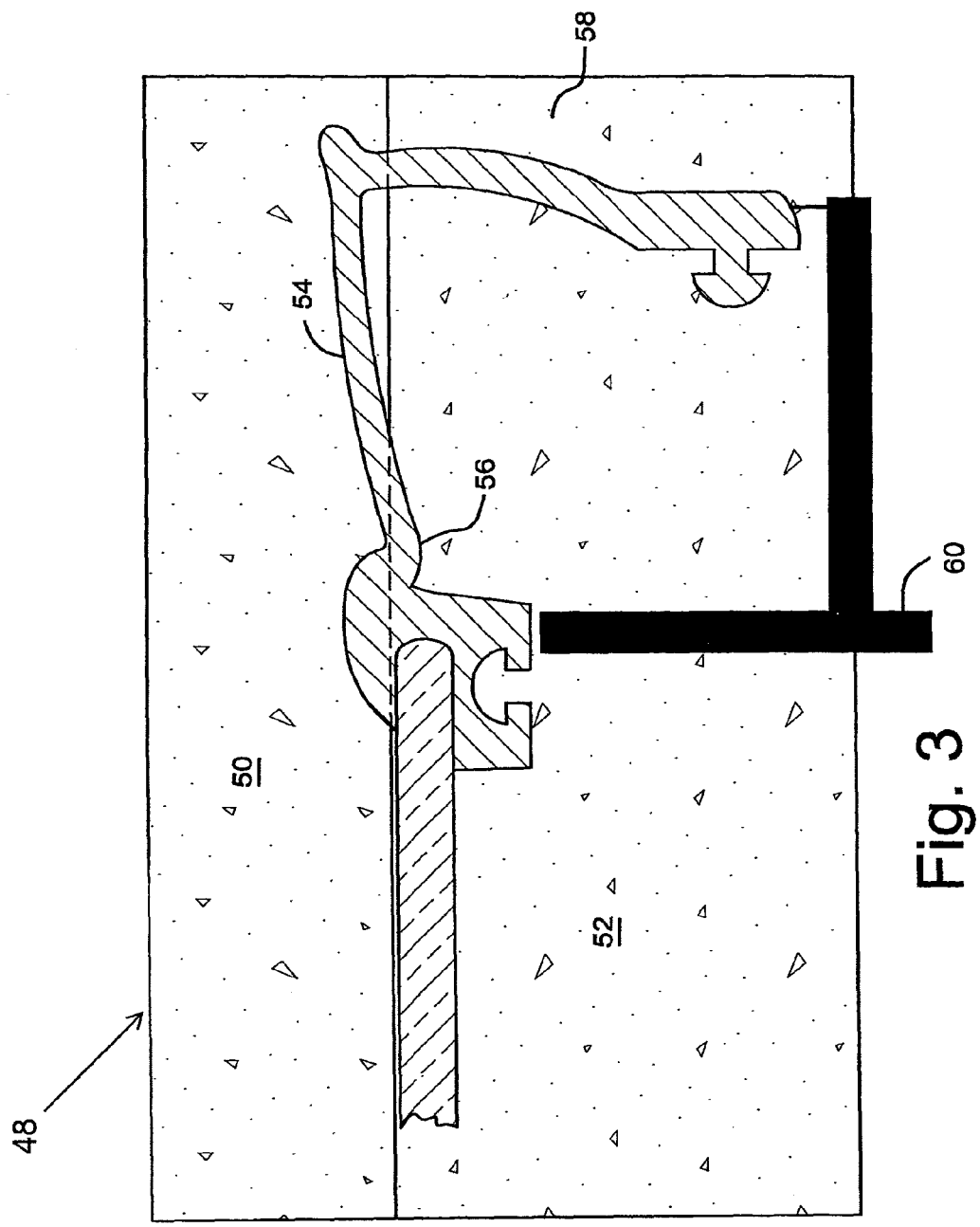
FIG. 3 shows, schematically, a portion of an exemplary apparatus for molding the seal of the invention.

Turning to FIG. 3, a mold 48 for making the seal 14 of the invention is shown in cross-section. The mold 48 may be any suitable mold, but is preferably a two-part mold, comprising upper 50 and lower 52 mold halves. Each mold half 50, 52 is preferably formed from metal, for example, steel or aluminum. Mold cavities 54, 56 are formed in the upper and lower mold halves 50, 52, as necessary. To facilitate molding of the seal 14, a movable mold portion 58 may be utilized, preferably in the lower mold half 52, as shown in FIG. 3. Additionally, it is preferred that more than one injection point 60 may be utilized to convey the elastomeric molding material into the mold cavity, as shown in FIG. 3. Such multiple injection points 60 assist in reducing stresses in the molded seal 14. Any suitable molding method may be utilized; however, injection molding is preferred.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. An encapsulated window assembly comprising a transparent glass substrate having first and second major surfaces terminating in a peripheral edge with an interlockable seal molded onto a peripheral portion of substrate, the window assembly being fixed in a vehicle body opening defined by a metal bonding flange, the seal comprising:
    a base portion being in molded bonding contact with each of the first and second major surfaces and the peripheral edge of the glass substrate;
    the base portion further comprising:
        an exterior profile portion proximate the first major surface of the substrate;
        an interior profile portion proximate the second major surface of the substrate including a female locking portion;
        a connecting portion proximate the peripheral edge of the glass substrate connecting the exterior and interior profile portions of the base portion;
        a lip portion extending substantially laterally for a predetermined length from the exterior profile portion of the base portion, the lip portion comprising:
        a deformable profile portion;
        a distal locking portion including a male locking portion for interlocking with the female locking portion of the interior profile portion of the base portion, wherein the glass substrate comprises a first supporting member of the seal when in an interlocked configuration; and
        an elbow portion flexibly connecting the deformable profile portion and the distal locking portion;
        wherein the distal locking portion is adhesively bonded to the metal bonding flange to fix the window assembly in the vehicle body opening and such metal bonding flange comprises a second supporting member of the seal when the seal is in an interlocked configuration.

2. The encapsulated window assembly defined in claim 1, wherein the seal comprises a thermoplastic elastomer (TPE) compound having a Shore A hardness less than 50.

3. The encapsulated window assembly defined in claim 1, wherein the window assembly is a fixed quarter window.

4. The encapsulated window assembly defined in claim 1, wherein the deformable profile portion varies in thickness between 1 mm and 3 mm.

5. The encapsulated window assembly defined in claim 1, wherein when the seal is in an interlocked configuration, the deformable profile portion and the distal locking portion of the lip portion form an irregular elliptical profile when viewed in cross section.

6. A method of encapsulating a vehicle window and installing same in a vehicle body opening in a fixed manner, comprising:
    providing a transparent glass substrate having first and second major surfaces terminating in a peripheral edge;
    a base portion further comprising:
        an exterior profile portion proximate the first major surface of the glass substrate;
        an interior profile portion proximate the second major surface of the substrate, including a female locking portion;
        a connecting portion proximate the peripheral edge of the glass substrate connecting the exterior and interior profile portions of the base portion;
        a lip portion extending substantially laterally for a predetermined length from the exterior profile portion of the base portion, the lip portion further comprising:
        a deformable profile portion;
        a distal locking portion including a male locking portion;
        an elbow portion flexibly connecting the deformable profile and the distal locking portion;
    bending the lip portion at the elbow portion;
    interlocking the male locking portion of the distal locking portion into the female locking portion of the interior profile portion, wherein the interlocked seal forms an enclosed profile;
    providing a vehicle body having an opening therein, the periphery of the opening defined by a bonding flange and corresponding to the peripheral shape of the vehicle window; and
    adhesively bonding the distal locking portion of the seal to the bonding flange of the vehicle body opening to fix the window in the vehicle body opening, wherein the transparent glass substrate and the bonding flange comprise first and second supporting members, respectively.

7. The method defined in claim 6, wherein the seal comprises a thermoplastic elastomer compound having a Shore A hardness less than 50.

8. The method defined in claim 6, wherein the vehicle window is a fixed quarter window.

9. The method defined in claim 6, wherein the enclosed profile further comprises an enclosed space portion.

10. The encapsulated window assembly defined in claim 1, wherein the deformable profile portion comprises a preferentially flexible escape portion.

11. The encapsulated window assembly defined in claim 10, wherein the deformable profile portion is preferentially thinner than the distal locking portion of the seal.

12. The encapsulated window assembly defined in claim 11, wherein the deformable profile portion varies in thickness between 1 mm and 3 mm.

\* \* \* \* \*